Sept. 13, 1966 J. INTRATER ET AL 3,272,660

THERMOELECTRIC UNIT WITH ATTACHED TERMINALS

Original Filed Sept. 13, 1962 3 Sheets-Sheet 1

INVENTORS
JOSEF INTRATER
LAWRENCE R. HILL
BY James and Franklin
ATTORNEYS

THERMOELECTRIC UNIT WITH ATTACHED TERMINALS

Original Filed Sept. 13, 1962 3 Sheets-Sheet 2

INVENTORS
JOSEF INTRATER
LAWRENCE R. HILL
BY
James and Franklin
ATTORNEYS

Sept. 13, 1966 J. INTRATER ET AL 3,272,660

THERMOELECTRIC UNIT WITH ATTACHED TERMINALS

Original Filed Sept. 13, 1962 3 Sheets-Sheet 3

INVENTORS
JOSEF INTRATER
LAWRENCE R. HILL
BY
James and Franklin
ATTORNEYS

／United States Patent Office 3,272,660 Patented Sept. 13, 1966

3,272,660 THERMOELECTRIC UNIT WITH ATTACHED TERMINALS

Josef Intrater, New York, N.Y., and Lawrence R. Hill, Short Hills, N.J., said Intrater assignor to Electronics & Alloys, Inc., Ridgefield, N.J., and said Hill assignor to General Instrument Corporation, Newark, N.J., both corporations of New Jersey Original application Sept. 13, 1962, Ser. No. 223,871, now Patent No. 3,197,845, dated Aug. 3, 1965. Divided and this application Feb. 14, 1964, Ser. No. 345,034
12 Claims. (Cl. 136—205)

This application is a division of our prior application Serial No. 223,871, filed September 13, 1962, now Patent No. 3,197,845, and assigned to the assignees of this application, which was, in turn, a continuation-in-part of our prior application Serial No. 165,907, filed January 12, 1962, now abandoned, and also assigned to the assignees of this application.

The present invention relates to an improved assembly of a thermoelectric element with electrical contact terminals attached thereto.

One major problem which has arisen in connection with the manufacture and use of elements having thermoelectric properties is the attachment of electrical contact terminals thereto and the maintenance of those terminals in proper electrical connection therewith under operating conditions. Other problems involved in the use of such materials are derived from their cost, their lack of physical strength, and their lack of homogeneity. The present invetion provides particularly effective solutions for the major problem relating to the electrical connection of terminals to the thermoelectric bodies, and at the same time ameliorates the other specified problems.

Many factors are involved in achieving proper electrical and physical connection between thermoelectric bodies and the contact terminals which can be used therewith. From an electrical point of view, the surface or contact resistance between the terminal and the thermoelectric element must be kept as low as possible. From a chemical point of view, the thermoelectric element must be kept free of contaminants which, if present even in minute quantities, would seriously adversely affect its thermoelectric characteristics. From a mechanical point of view, the bond between the thermoelectric element and the contact element must be sufficiently strong to maintain the two elements in secured-together condition. From an environmental point of view, the mechanical and electrical connections must be effective over a very wide temperature range and must be capable of withstanding severe vibration and shock.

In the past, various methods of bonding terminal elements to thermoelectric bodies have been proposed, all of which involved subjecting the devices to elevated temperatures. Since the presence of oxides of the various metals involved will contaminate the thermoelectric elements, it has been necessary to carry out these bonding procedures in an inert or non-oxidizing atmosphere, thus greatly complicating manufacturing and increasing expense. Even then, an appreciably high contact resistance between terminal and thermoelectric bodies results, and the widely differing temperature coefficients of expansion of the two dissimilar bodies makes for a lack of permanence in the bond, or for an increase in contact resistance when the assembly is subjected to elevated and cyclically varying temperatures, or both.

In accordance with the present invention, a self-sustaining body of thermoelectric material is formed simultaneously with the effective bonding of the terminal elements thereto, and in a manner which is readily carried out and which does not require the use of inert or non-oxidizing atmospheres. This alone represents a very significant advantage. In addition, and significantly, it has been found that through the use of the method of the present invention the thermoelectric bodies themselves have improved physical and thermoelectric properties, particularly insofar as strength, homogeneity and higher figures of merit are concerned. Moreover, the contact resistance between the terminals and the thermoelectric bodies are extremely low, and remain low even when the thermoelectric bodies are subjected to cyclically varying temperatures. Refinements and improvements in the present invention have resulted in a further and marked reduction in contact resistance even beyond the highly satisfactory value achieved with less complicated versions of the basic method, the refined versions also resulting in improved physical and electrical uniformity of the units and greater reliability when subjected to temperature variation. It follows that when the present invention is followed, a smaller amount of thermoelectric material need be used to produce a given thermoelectric effect. The present invention lends itself to the accurate design of individual thermoelectric assemblies to exhibit desired electrical characteristics. Moreover, with the construction formed by the present invention the mounting of the thermoelectric elements in appropriate sockets or receptacles and the attachment thereto of external electrical connections, as well as heat-radiating fins or other appurtenances, is greatly facilitated.

More specifically, the unit, comprising a thermoelectric body with contact terminals attached thereto, is formed by inserting an appropriate amount of thermoelectric material (or substances capable of forming a thermoelectric body) into a container formed of material appropriate for the electrical terminals, or at least having an inner surface thus constituted. The container is closed, is subjected to an elevated temperature and is mechanically worked so as to reduce its transverse dimension while permitting the assembly to elongate. In most instances the mechanical working itself develops sufficient heat so that it is not necessary to subject the assembly to a separate heating operation. The working continues until the initial transverse dimension has been appreciably reduced. The working causes the thermoelectric body to be constituted by the core of the assembly, the sheath of the assembly defining contact terminal material, a firm and intimate bond between the central thermoelectric core and the surrounding terminal sheath being produced. Next the sheath material is removed from a portion of the length of the thermoelectric core, exposing a portion thereof. The remaining sheath portions constitute the electrical terminals, and the amount of core exposed determines the thermoelectric characteristics of the unit. The thermoelectric material, in being thus worked, becomes highly densified and consequently has a mechanical strength which is superior to that which has been attained in previously used methods of fabrication. In addition, marked increases in electrical homogeneity and in values of the Seebeck coefficient have been noted. The sheathing contact terminals provide a degree of mechanical support for the thermoelectric body, and in addition constitute structural members available for mounting or attaching purposes.

It is noteworthy that in carrying out the present invention one need employ only those substances appropriate to the production of the thermoelectric body per se and the contact terminal therefor—no intermediate bonding material is required—and that the operation may be carried out in air and through the use of readily available mechanical equipment such as swaging presses or rolling mills.

It has been found desirable in some instances to utilize a pair of concentric sheaths during the working steps, the inner sheath having a composition optimum to its function as a terminal, the outer sheath being tough and protecting the inner sheath against rupture or damage during the working step, the outer sheath thereafter being removed from the unit.

In order to prevent the thermoelectric material from escaping through the ends of the sheath, and in order to further minimize the contact resistance between the thermoelectric core and the sheath portions thereon and the reliability of that contact when the device is subjected to cyclically varying temperatures, the sheaths are caused to project axially beyond the ends of the core, thereby producing an internal recess. An expansible and flexible conductive element such as a coil of wire is received in that recess, the wire being physically and electrically connected, as by physical contact and soldering, to the end surface of the thermoelectric core and to the radially inner surface of the sheath recess. This greatly increases the area of contact between sheath and core and thus greatly reduces the contact resistance therebetween. Moreover, the recess provides a space into which portions of the thermoelectric material can move when forced in that direction by thermal action, and the flexibility of the conductive element ensures that effective electrical contact will exist even after many cyclical distortions of the thermoelectric material.

Electrical connection to the sheath portions, which define terminals, has been found to be facilitated by providing the outer surfaces of those sheaths with grooves into which resilient snap rings of conductive material are inserted, portions of those rings extending from the grooves and constituting points to which external leads may readily be attached.

To the accomplishment of the above, and to such other objects as may hereinafter appear, the present invention relates to an electrical unit comprising an electrically active core with contact terminals attached thereto as defined in the appended claims, and as described in this specification, taken together with the accompanying drawings, in which:

The invention is here specifically described in connection with the formation of units having thermoelectric characteristics, but it has applicability to the formation of other units where low contact resistance between a fabricated electrically active body and the contact terminals therefor is necessary. Many types of materials are known which exhibit thermoelectric characteristics. In general, they comprise intermetallic compounds of certain elements many of which are to be found in Groups II, IV, V and VI of the Peroidic Table. Among such elements are cadmium, antimony, zinc, silicon, germanium, bismuth, tellurium, selenium, lead, sulphur, mercury and cesium. Most widely used today are lead-tellurium, bismuth-tellurium, and cesium-sulphur intermetallic compounds. The proportions of the constituent elements needed to form these intermetallic compounds, and the proportions and nature of other elements or compounds which may be added thereto to improve or modify the resultant thermoelectric characteristics of the basic intermetallic compounds, are all well known to those skilled in the art, and the selection of one or another thermoelectric material, and the elements going to make up that material in proper proportions, are, insofar as the present invention is concerned, matters of choice well within the capabilities of those normally skilled in the art. Each thermoelectric compound is sensitive to different materials, the presence of such materials greatly adversely affecting their thermoelectric properties. Accordingly, for each intermetallic compound the composition of the contact terminal therefor must be carefully chosen. Thus, for lead-tellurium compounds terminal contacts of iron or stainless steel are appropriate; for bismuth-tellurium compounds terminal contacts of nickel are appropriate, and for cesium-sulphur compounds terminal contacts of tungsten or tantalum are appropriate.

The electrical and physical connection of iron or stainless steel terminals to thermoelectric bodies of the lead-tellurium type has posed particularly troublesome problems to the art, and the present invention is therefore thought to be most advantageous in connection with assemblies of that type. It is, however, also of significance in connection with other compositions because of the improvement in the characteristics of the thermoelectric material which result from the method and the simplicity of the manipulative steps involved.

Figure 7:
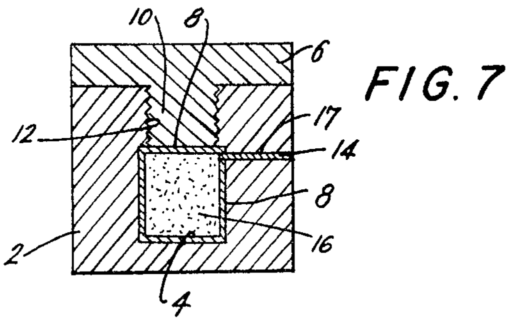
FIG. 7 illustrates a modification of the embodiment of FIG. 1.

In carrying out the present invention, as shown in FIGS. 1–7, a cup-like container 2 having an internal cavity 4 and provided with a cover 6 is utilized. This container is formed of a material which is physically workable and electrically conductive, and which is preferably compatible with the composition of the particular intermetallic compound to be utilized therewith, that is to say, which will not deteriorate or degrade the intermetallic compound. Thus, in the case of lead-tellurium compounds, the container 2 may be formed of iron or stainless steel, with bismuth-tellurium compounds it may be formed of nickel, and with cesium-sulphur compounds it may be formed of tungsten or tantalum. If desired, and is indicated in FIG. 7, the entire container 2 need not be formed of a compatible material, provided that its inner surfaces, adapted to contact the thermoelectric material, are so constituted. Thus, the cavity 4 of container 2 may be provided with a lining 8 of the appropriate compatible material, the outer portions of the container 2 being formed of some other physically workable and electrically conductive substance.

For example, when the thermoelectric material comprises a bismuth-tellurium compound the body of the container 2 could be of iron, while the lining 8 is of nickel. With cesium-sulphur compounds a tungsten container 2 could have a lining 8 of tantalum. Thus the optimum substance in contact with the thermoelectric composition can be employed as the lining 8, the requisite workability and mechanical strength being provided by the material of which the body of the container 2 is formed.

In some instances the presence in the thermoelectric material of certain impurities improves the thermoelectric characteristics. For example, with lead tellurium compounds the addition of small amounts (½–5% by weight) of tin or a tin-tellurium intermetallic compound has been found to increase voltage output, decrease internal resistance, and increase resistance stability with temperature change. It has been found advantageous to line the inner surface of a container 2 of compatible material with such "impurity" material to improve the electrical and thermoelectric characteristics of the finished unit. Thus, with a lead-tellurium thermoelectric material, a container 2 formed of iron or steel may be plated with tin.

The cover 6 may be secured in place by having an externally threaded depending portion 1 received within an internally threaded portion 12 of the container 2 which communicates with the cavity 4. A porting aperture 14 passes through a side wall of the container 2 and communicates with the cavity 4 adjacent its upper end.

The cavity 4 is filled with a charge 16 of the desired thermoelectrically active material, which may be in powdered or granulated form. When the cover 6 is screwed into place it will compress the charge 16 of thermoelectric material, and entrapped air will be forced out through the porting aperture 14, after which that aperture is plugged with material 17. Care should be taken that the material 17 is not of a type which will contaminate the thermoelectric material 16. It is preferably of the same composition as that of the body of the container. The purpose of the porting aperture 14 is to permit air to escape from the cavity 4, the subsequent plugging of that aperture preventing air from entering the cavity 4 and preventing the thermoelectric material 16 from escaping therefrom.

Figure 1:
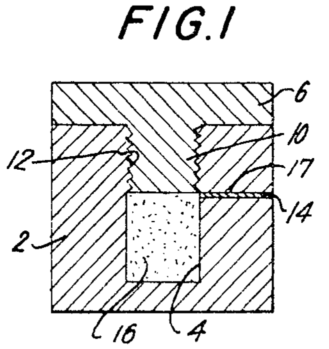
FIG. 1 is a cross sectional view illustrating a preliminary step in the carrying out of the method involved in the present invention.

The thus formed assembly, as shown in FIGS. 1 and 7, has an appreciable transverse dimension and a relatively short longitudinal dimension. Purely by way of example, the diameter of the cavity 4 may be .380 inch and the diameter of the sheathing container 2 may be .507 inch.

Next the assembly such as is shown in FIGS. 1 and 7 may be heated to cause the charge 16 of thermoelectric material to melt and to partially bond itself to the sheathing material which surrounds it, and while it is at such an elevated temperature the assembly is mechanically worked in any appropriate manner so as to become compressed in a lateral direction, with consequent longitudinal elongation of the unit. This mechanical working may be accomplished by passing the unit one or more times through a rolling mill, by subjecting it to a mechanical swaging operation, by forging, by drawing, or by using any other appropriate mechanical means. It has been found that in most cases a separate heating step is not required, since the mechanical working itself produces sufficient heat in the assembly. The degree of lateral compression and longitudinal elongation required is not believed to be critical. Excellent results have been obtained when the working is carried out sufficiently to reduce the lateral dimension by a factor of two, but further reduction of the lateral dimension is entirely feasible, the only known limiting requirement being the production of a thermoelectric core having sufficient strength to withstand the stresses to which it will be subjected in use. Reduction of an initial .380 inch diameter for the thermoelectric material to .01 inch is entirely feasible.

Figure 2:
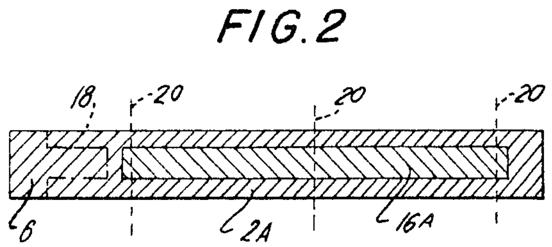
FIG. 2 is a cross sectional view showing the formed assembly after its transverse dimension has been reduced through mechanical working, and indicating that a single elongated assembly may be severed into a plurality of individual units.
Figure 3:
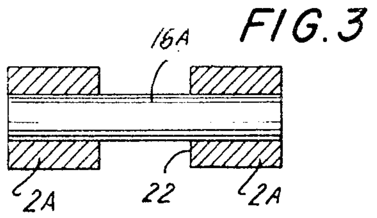
FIG. 3 is a cross sectional view of one of those individual units with the sheath removed from a portion of the core.
Figure 6:
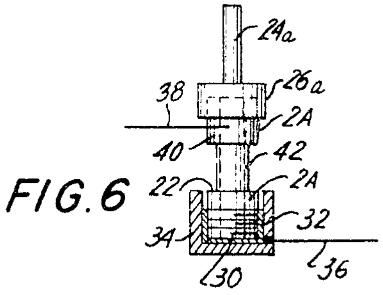
FIG. 6 illustrates the unit mounted in an internally threaded socket.

The resulting structure is shown schematically in FIG. 2, and comprises a compressed and densified core 16A of thermoelectric material surrounded by a sheath 2A formed of the physically workable and electrically conductive material which constituted the original container 2. The working has amalgamated the cover 6 with the container 2, so that the line of demarcation between the cover 6 and the container 2 is indicated in FIG. 2 only by the phantom lines 18.

The pressure exerted on the assembly during the physical working together with the elevated temperature at which the assembly is worked creates a diffusion bond between the thermoelectric material 16A and the sheathing conductive material 2A, with the conductive material 2A pressed closely against the thermoelectric material 16A. As a result the contact resistance between them is exceptionally low, and in most cases practically zero. In addition, the physical working of the thermoelectric material 16A produces an electrical homogeneity of high order. In conventionally formed thermoelectric bodies the Seebeck coefficient varies widely from point to point, in some instances by as much as 100%, probably because of the irregular grain structure of those bodies. The thermoelectric material 16A, after mechanical working as here described, has a Seebeck coefficient which is exceptionally uniform from point to point thereon and in all directions, and is in addition greater than that of conventionally formed comparable materials. The exact reason for this is not known, but it is believed that the grain structure of the thermoelectric material 16A is in the form of closely packed and greatly elongated needle-like grains, and that the improved electrical characteristics and the improved mechanical strength which the mechanically worked thermoelectric material 16A exhibits derives from this grain structure.

The radially inner surface of the cavity 4 of the container 2 may be internally threaded. Although the threaded shape will be distorted during the physical working of the assembly to produce the unit shown in FIG. 2, the contact resistance between the sheath 2A and the core 16A, for a given axial length along the assembly, will be reduced because of the increased area of the contact produced by the threads.

The elongated unit of FIG. 2 may be cut along the transverse lines 20 into a plurality of individual units. Next the sheath 2A is removed from a central portion 22 of a unit in any appropriate way, as by machining (see FIG. 3), thus exposing a portion of the thermoelectric core 16A while leaving the conductive sheaths 2A in place at either end thereof. The length of the thermoelectric core 16A which is thus exposed will determine the desired electrical characteristics of the unit. The desired internal resistance of the thermoelectric unit is dependent upon its coefficient of resistivity and upon the factor $L/A$, where L is the exposed length and A is the cross-sectional area. It is significant to note that, because the contact resistance between the core 16A and the sheath 2A is so small, thermoelectric units having very low internal resistance may be used, and as a result only short lengths of the core 16A need be exposed and only small volumes of thermoelectric material need be employed. The shortness of the exposed length of the core 16A improves the strength factor of the unit, and the small volume of thermoelectric material which need be used reduces its cost. The coefficient of resistivity of the thermoelectric material 16A produced in accordance with the present invention compares favorably with the coefficient of resistivity of similar materials produced in more conventional manner, and any increase in coefficient of resistivity exhibited by the material 16A when compared to those of the prior art is much more than offset by the exceptionally low contact resistance between itself and the contact terminals defined by the sheathing 2A.

Moreover, since the temperature coefficient of expansion of the thermoelectric material 16A is greater than that of the sheathing material 2A, subjection of the unit to an elevated temperature when in use will merely increase the physical engagement between the sheathing terminals 2A and the thermoelectric material 16A, thus producing an actual decrease in contact resistance and ensuring firm physical connection. In addition, since the core 16A of thermoelectric material is much thinner than has previously been employed, and probably because of its relatively fibrous or elongated-grain structure, the tendency of the thermoelectric material 16A to crack under thermal stress is greatly reduced.

Figure 4:
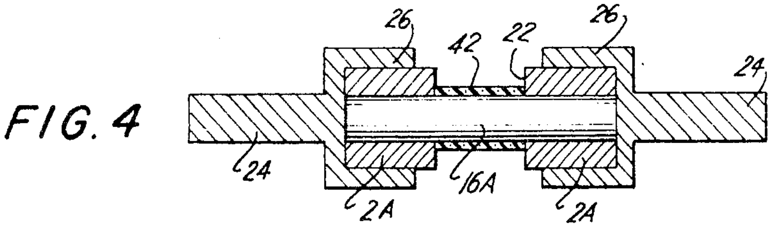
FIG. 4 is a view illustrating the unit of FIG. 3 with heat-radiating fins attached thereto by a press-fitting or heat-shrinking step.
Figure 5:
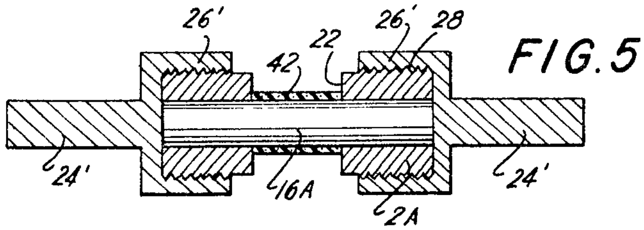
FIG. 5 is a view similar to FIG. 4 but showing the fins screw-threaded onto the unit.

The existence of the terminal structures 2A in the form of self-supporting mechanical elements of appreciable strength and ready accessibility greatly facilitates the mounting of the thermoelectric assemblies in position in electrical sockets or on furnace walls, and further greatly facilitates the attachment of appurtenances thereto, such as cooling fins or other heat radiators. Thus, as indicated in FIG. 4, cooling fin assemblies comprising fins 24 and sockets 26 are attached to opposite ends of the thermoelectric assembly either by press-fitting the sockets 26 over the sheathing terminals 2A or by shrink-fitting them into position, the sockets 26 first being heated and expanded, then being slipped over the terminals 2A and permitted to cool. Alternatively, and as shown in FIG. 5, the outer surface of the terminals 2A may be externally threaded, at 28, the sockets 26' connected to the cooling fins 24' being correspondingly internally threaded. The parts 24 and 26 could be conductive, and could be used to make electrical connection with the terminal contacts 2A. As shown in FIG. 4, the upper contact terminal 2A of the thermoelectric assembly has a cooling fin *24a* secured thereto in either of the manners disclosed in FIGS. 4 and 5, the lower contact terminal 2A thereof being externally threaded at 30 and screwed into a conductive socket 32 mounted within a shell 34, the lead 36 extending out through the shell 34 and being connected to the socket 32. The lead 38, adapted to be electrically connected to the other end of the thermoelectric unit, may be soldered or otherwise secured to a portion of the upper terminal 2A which extends below the cooling fin socket *26a*. It is desirable, for protective purposes, that the exposed portion of the thermoelectric core 16A be covered by an insulating sheath 42, which may be applied thereto in any appropriate manner.

Experience in carrying out of the method above specifically described has resulted in the observation of certain phenomena which, while neither destroying nor significantly detracting from the utility and value of the method in question, nevertheless are desirably eliminated. For example, the container 2, when being worked, has from time to time exhibited a tendency to fracture or break, particularly if the operator should, through inattention, cause the working action to be carried on somewhat more rapidly than is proper. Furthermore, since, as has been mentioned, the temperature coefficient of expansion of thermoelectric material 16A is greater than that of the sheathing material 2A, when the unit is subjected to an elevated temperature the thermoelectric core 16A will tend to expand longitudinally, and in some instances to bulge or creep out beyond the ends of the unit, with consequent deterioration of internal resistance and possible loss of thermoelectric material. In addition, further reduction of the contact resistance between the sheaths 2A and the thermoelectric core 16A, beyond its already quite low value when compared wtih prior art arrangements, was obviously desirable. Also, the attachment of external leads 38 by soldering directly to a sheath portion 2A was not as convenient an operation, from a manipulative point of view, as might be desired, and the strength of the mechanical joint produced left something to be desired.

Certain refinements in, or additions to, the basic method as disclosed in FIGS. 1–7 have therefore been devised with a view to, and having the effect of, solving one or more of the problems described in the immediately preceding paragraph. The overall method disclosed in FIGS. 8–19 includes all of these refinements, but it will be appreciated that individual additions to the method disclosed in FIGS. 8–19 could be eliminated, the remaining elements of that method still making their own contributions and producing their own characteristic advantages.

Figure 8:
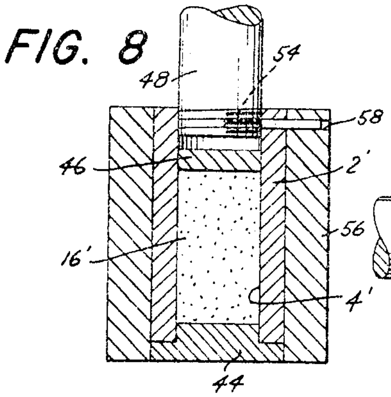
FIG. 8 is a cross sectional view illustrating a preliminary step in the carrying out of an alternative and improved method involved in the present invention.

As disclosed in FIG. 8, a tubular container 2' having a central axial cavity 4', and formed of Armco iron or similar material, preferably having the radially inner surface thereof tin-plated and optionally internally threaded, has its lower end closed by a plug 44 of Armco iron or the like. The main body of the interior of the container 2' is filled with a charge 16' of the desired electrically active material, which may be in powered or granulated form, and a spacer 46, which may be formed of aluminum, is placed on the upper surface of the charge 16'. The spacer 46 does not come to the top of the tubular container 2', and a manipulating handle 48 is screwed into the exposed upper end of the container 2', after which rotation of the handle 48 relative to the container 2' is prevented by passing a pin 50 through apertures 52 and 54 in the container 2' and the handle 48 respectively.

It has been found desirable to axially compress the charge 16' within the container 2', a pressure on the order of twenty-six thousand pounds per square inch having been found to be quite effective.

In order to support and protect the tubular container 2' during the working treatment to follow, and outer sheath 56 may be applied over the inner sheath or container 2', the outer sheath 56 being of a harder or tougher material than the inner sheath 2'. For example, when the inner container 2' is formed of Armco iron, which is preferable to stainless steel insofar as functioning as an electrical terminal is concerned, the outer sheath 56 may be formed of stainless steel, thereby giving to the assembly, during the working operation, the desired structural strength. When an outer sheath 56 is used, the pin 50 which prevents rotation of the handle 48 may extend through an aperture 58 in the outer sheath 56. In order for the outer sheath 56 to provide proper support for the inner container 2', it should fit snugly thereabout. A press-fit has been found to be highly satisfactory in this regard.

Figure 9:
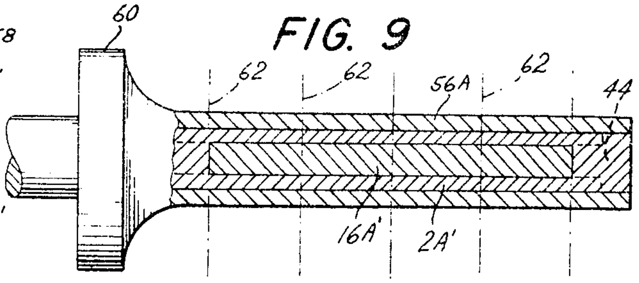
FIG. 9 is a cross sectional view showing the assembly of FIG. 8 after its transverse dimension has been reduced through mechanical working, and indicating that a single elongated assembly may be severed into a plurality of individual units.

The assembly shown in FIG. 8, readily manipulated by means of the handle 48, is then heated and worked in the manner described above in connection with FIGS. 1–7, as by being inserted into a swaging machine. That portion of the assembly nearest the handle 48, designated 60 in FIG. 9, is not itself laterally compressed and longitudinally elongated but, as is clearly shown in FIG. 9, that portion of the assembly containing the thermoelectric material 16' is thus laterally compressed and longitudinally elongated, thereby producing the compressed and densified core 16A' of thermoelectric material surrounded by the inner sheath 2A' of Armco iron which is bonded thereto, the inner sheath 2A' in turn being surrounded by the outer sheath 56A of stainless steel. The plug 44, the outline of which is schematically shown in broken lines in FIG. 9, is, as a consequence of the working to which it has been subjected, amalgamated with the sheath 2A' which is formed of the same material. As was the case in connection with the method shown in FIG. 7, the combination of pressure and elevated temperature creates a diffusion bond between the thermoelectric material 16A′ and the sheathing conductive material 2A, and in addition, when the sheathing 2A′ is plated with tin or a tin-tellurium intermetallic compound, some of the tin or tin-tellurium diffuses into the thermoelectric body 16A′.

Figure 10:
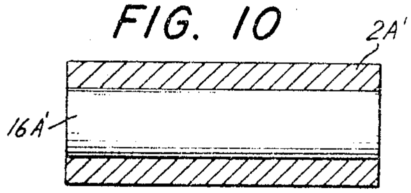
FIG. 10 is a cross sectional view of one of those individual units, with the outer sheath removed therefrom.
Figure 11:
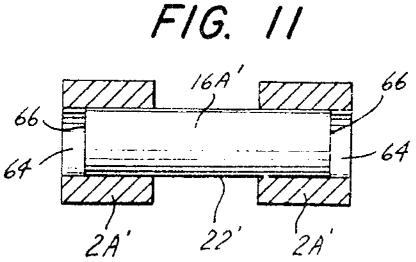
FIG. 11 is a view similar to FIG. 10 but showing the unit with the sheath removed from a central portion of the core and with end portions of the core removed so as to produce recesses within the sheaths at the ends of the core.
Figure 12:
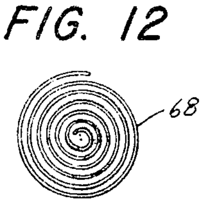
FIG. 12 is a top plan view of an expansible conductive element in the form of a wire coil.
Figure 13:
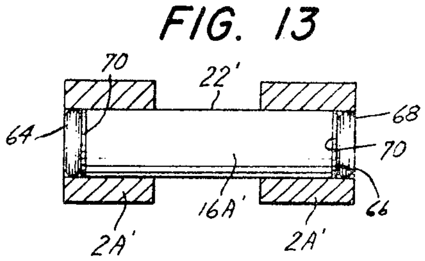
FIG. 13 is a view similar to FIG. 11 but showing the wire element of FIG. 12 in place in the end recesses of the sheaths.
Figure 14:
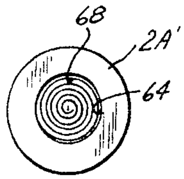
FIG. 14 is an end elevational view of the assembly of FIG. 13.

The elongated unit of FIG. 9 may then be cut along the transverse lines 62 into a plurality of individual units. The outer sheath 56A is removed from the inner sheath 2A′, as by a machining operation, either before or after the individual units are formed. FIG. 10 illustrates one such individual unit, which is formed of the thermoelectric core 16A and the conductive sheath 2A′.

Next, as in the process of FIGS. 1–7, the sheath 2A′ is removed from a central portion 22′ of a unit in any appropriate way, as by machining, thus exposing a portion of the thermoelectric core 16A′ while leaving the conductive sheaths 2A′ in place at either end thereof. In addition, in accordance with the method now specifically under discussion, recesses 64 are provided in the axially outer portions of the sheaths 2A′ communicating with end surfaces 66 of the thermoelectric core 16A′. These recesses 64 may be formed by machining or otherwise removing thermoelectric material from the inside of the sheaths 2A′.

The recesses 64 are formed with two primary objectives in mind—to make a better electrical connection between a given sheath 2A′ and the core 16A′, thereby to reduce the contact resistance therebetween, and to make said electrical connection more capable of withstanding cyclical temperature change without deterioration.

Figure 15:
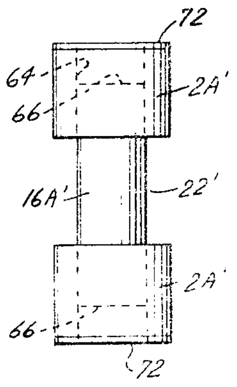
FIG. 15 is a slide elevational view of the assembly of FIG. 13 with end shims of soldering material in place thereon, the assembly being ready for a soldering step.
Figure 16:
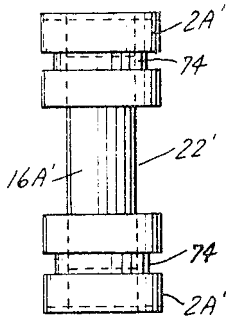
FIG. 16 is a view similar to FIG. 15 but showing the unit after the soldering of the wire coils has been completed, and showing a groove formed in the external surface of each sheath.

The recesses 64 serve as spaces into which the thermoelectric material can axially expand, and they further constitute receptacles for electrical connecting means which produce the desired improved electrical connection without preventing axial movement of the thermoelectric material into the recesses under appropriate temperature conditions. To that end there is inserted into each recess 64 a radially expansible and flexible electrically conductive member 68 (see FIG. 12), here shown in the form of a helically coiled iron wire which, for purposes of providing proper conductivity and mechanical and electrical connection, is preferably tin-coated and then gold and silver-plated. In a typical unit the depth of a given recess 64 may be .025 inch, in which case the diameter of the wire used in the element 68 may be approximately .020 inch. The diameter of the helix is preferably greater than the inner diameter of the recess 64 so that the coil 68, when inserted thereinto, will resiliently engage the inner surface of the sheath 2A′. The effect of the conductive element 68 is intensified if the unit of FIG. 11, before the element 68 is inserted thereinto, is first gold-plated and then silver-plated, the plating thereafter being removed from the area 22′ in order to avoid a short circuit. Also, before the element 68 is inserted into the recess 64, the corresponding end surface 66 of the core 16A′ may be scratched to expose unoxidized thermoelectric material, and a tin shim 70, having a thickness of approximately .005 inch, is interposed between the conductive element 68 and the end surface 66. Thereafter, as indicated in FIG. 15, a second tin shim 72, which also may have a thickness of .005 inch, is applied over the end surface of the unit. It has been found desirable to cover the shim 72 with graphite powder in order to ensure intimate contact.

The above described procedure is carried out at each end of the unit, and thereafter each end is covered with a graphite boat. The exposed areas of the unit may be painted with colloidal graphite to prevent tin from coating such exposed areas.

It has been found that if the inside of the recess 64 is painted with a copper bromide solution after the unit has been coated and plated but before the shim 60 and conductive element 68 are placed in the recess 64, an excellent bond is produced and it is not necessary to scratch the exposed face 66 of the core 16A′, particularly when that core is formed of a lead-tellurium material.

The assembly of the unit with graphite boats at each end is placed in a pressure clamp and axial pressure is exerted thereon. The unit is inserted into a hydrogen atmosphere and subjected to a temperature such as to melt the tin shims 70 and 72. That temperature being on the order of 700° C. As a result the tin flows into the recess 64 and securely bonds the conductive element 68 both physically and electrically to the end surface 66 of the thermoelectric core 16A′ and to the radially inner surface of the sheath 2A′. As a result the area of electrical contact between terminal sheath and core is greatly increased, with a resultant marked decrease in contact resistance.

The recess 64 need not be completely filled by the wire coil 68 and the tin from the shims 70 and 72, although it may be filled thereby. In either event any tendency of the core 16A′ to expand axially when subjected to elevated temperatures is permitted without any escape of thermoelectric material from the unit proper. Moreover, the flexibility of the wire coil 68 ensures that effective electrical connection is maintained despite repeated expansions and contractions of the thermoelectric core.

After the unit has been appropriately heated so that the conductive element 68 becomes soldered to the core 16A′ and the sheath 2A′, it is permitted to cool down in the hydrogen atmosphere in order to prevent oxidation. After it has cooled it is cleaned. It has been found advantageous if, after cleaning, the unit is again silver-plated at a very low voltage below one volt, with the deposited silver plate again being removed from the area 22′ in order to prevent short circuits.

Figure 17:
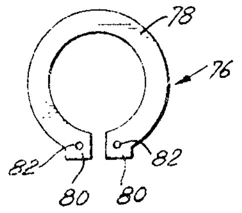
FIG. 17 is a top plan view of a typical resilient split ring such as may be employed with the unit of FIG. 16.
Figure 18:
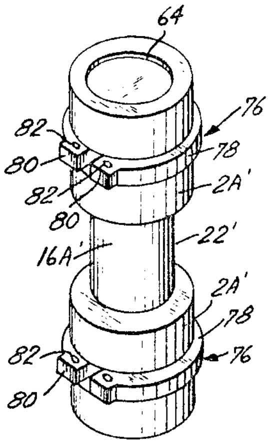
FIG. 18 is a three-quarter perspective view of the assembly of FIG. 16 with the resilient split rings applied thereto.

In order to facilitate the making of electrical connections to the terminal sheaths 2A′, it has been found desirable to form, in the outer surface of each sheath 2A′, a groove 74. A resilient snap ring or comparable member, such as the split ring 76 illustrated in FIG. 17, is adapted to be inserted into groove 74, the ring 76 having a body 78 the thickness of which is preferably closely the same as the width of the grove 74, and having ears 80 at the ends of the body 78, those ears being provided with apertures 82 with which a suitable applicator tool is designed to engage to expand the ring 76 and permit it to snap, by means of its own resiliency, into groove 74. The ears 80 project out beyond the groove 74 and therefore constitute areas to which external leads may readily be connected. Indeed, a lead can be passed through an aperture 82 and thus be secured in place in an extremely reliable manner. In order to improve the electrical connection between the ring 76 and the terminal sheath 2A′, the ring is desirably plated with silver or palladium before it is employed.

Figure 19:
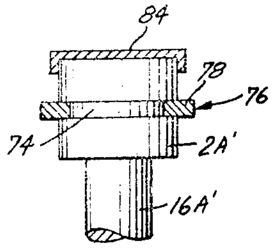
FIG. 19 is a cross sectional view, taken along the line 19—19 of FIG. 18, and showing a cover secured to the sheath and closing the open end of the recess in the sheath.

If desired, as illustrated in FIG. 19, caps 84 may be placed over the ends of the sheaths 2A′ and secured in place in any appropriate manner. These caps provide for better heat transfer and also serve to ensure against the escape of any thermoelectric material from the unit.

From the above it will be appreciated that the thermoelectric assemblies of the present invention are formed in a manner which has many advantages over the procedures formerly used. The thermoelectric bodies themselves are formed at the same time that the contact terminals are secured thereto, thus requiring only a single operation where a plurality of operations were previously required. The operations are performed with the use of readily available conventional mechanical equipment, and do not require the use of inert or non-oxidizing atmospheres. The thermoelectric bodies themselves, as thus produced, are superior to those of the prior art, particularly with regard to mechanical strength, electrical characteristics, electric homogeneity, and resistance to thermal stresses.

The terminals are so secured thereto as to have a truly minimal contact resistance, thus making for greater efficiency and permitting the use of smaller amounts of the very expensive thermoelectric material. By varying the specific conditions of mechanical working the characteristics of the thermoelectric material, and particularly its grain size, can be controlled to produce desired results. The electrical characteristics of the individual units can be tailored to the specific application desired by determining the extent of the length of the core 16A which is to be exposed by the removal of the sheath 2A therefrom. The resulting structure is uniquely adapted to the ready attachment thereto of various appurtenances and to the ready mounting thereof in sockets or the like.

By utilizing one or more of the additional techniques disclosed in FIGS. 8–19 the units of the present invention may be provided with terminal sheaths which are optimum from an electrical point of view but which may not, in and of themselves, be capable of withstanding the working to which the unit is subjected in the course of its formation, the escape of thermoelectric material from the unit at elevated temperatures may be prevented, the contact resistance between the terminal sheaths and the thermoelectric core may be greatly reduced and remains at a low value despite wide and cyclical variations in temperature, and electrical connection to the thermoelectric unit may be greatly facilitated.

While but a limited number of embodiments of the invention have been here disclosed, it will be apparent that many variations may be made therein, all within the scope of the instant invention as defined in the appended claims.

We claim:

1. In combination, a core comprising an intermetallic compound in the form of closely packed and longitudinally elongated needle-like grains, and sheaths of physically workable, electrically conductive material which will not degrade said intermetallic compound, said sheaths respectively surrounding, being pressed closely against, and diffusion bonded to longitudinally spaced portions of said core, the portion of said core between said sheaths being free of said sheath material.

2. The combination of claim 1, in which said intermetallic compound comprises lead and tellurium and said sheath comprises a member of the group consisting of iron and stainless steel.

3. The combination of claim 1, in which said intermetallic compounds comprises cerium and sulphur and said sheath comprises a member of the group consisting of tungsten and tantalum.

4. The combination of claim 1, in which said intermetallic compound comprises bismuth and tellurium and said sheath comprises nickel.

5. The combination of claim 1, in which at least one of said sheaths projects axially beyond an end of said core, thereby producing a recess within said sheath, and a conductive element in said recess and electrically and physically operatively connected to said end of said core and the radially inner surface of said recess.

6. The combination of claim 5, in which said conductive element is flexible.

7. The combination of claim 5, in which said conductive element is radially expansible.

8. The combination of claim 5, in which said conductive element is in the form of a flexible and radially expansible wire coil.

9. The combination of claim 1, in which at least one of said sheaths is grooved on its outer surface, and a conductive element in said groove and having a portion extending from said groove, said portion defining a point for the making of electrical connection thereto.

10. The combination of claim 1, in which at least one of said sheaths is grooved on its outer surface, and a resilient split ring of conductive material in said groove and having a portion extending from said groove, said portion defining a point for the making of electrical connection thereto.

11. In combination, a mechanically laterally compressed and densified and longitudinally elongated core comprising an intermetallic compound and sheaths of physically workable, electrically conductive material which will not degrade said intermetallic compound, said sheaths respectively surrounding, being pressed closely against, and diffusion bonded to longitudinally spaced portions of said core, the portion of said core between said sheaths being free of said sheath material, in which said intermetallic compounds comprises cerium and sulphur and said sheath comprises a member of the group consisting of tungsten and tantalum.

12. In combination, a mechanically laterally compressed and densified and longitudinally elongated core comprising an intermetallic compound and sheaths of physically workable, electrically conductive material which will not degrade said intermetallic compound, said sheaths respectively surrounding, being pressed closely against, and diffusion bonded to longitudinally spaced portions of said core, the portion of said core between said sheaths being free of said sheath material, in which said intermetallic compound comprises bismuth and tellurium and said sheath comprises nickel.

References Cited by the Examiner

UNITED STATES PATENTS

| | | | |
|---|---|---|---|
| 2,402,663 | 6/1946 | Ohl | 136—5 |
| 2,745,928 | 5/1956 | Glaser. | |
| 2,811,570 | 10/1957 | Karrer | 136—5 |

FOREIGN PATENTS

| | | |
|---|---|---|
| 775,968 | 5/1957 | Great Britain. |

WINSTON A. DOUGLAS, *Primary Examiner.*

ALLEN B. CURTIS, *Assistant Examiner.*